UNITED STATES PATENT OFFICE.

FREDERICK C. KRAUSE, OF NEW YORK, N. Y.

IMPROVED COMPOSITION FOR POROUS STONE FOR FILTERING AND OTHER PURPOSES.

Specification forming part of Letters Patent No. 37,696, dated February 17, 1863.

*To all whom it may concern:*

Be it known that I, FREDERICK C. KRAUSE, of the city, county, and State of New York, have invented a new and Improved Composition for Porous Stone; and I do hereby declare that the following is a full, clear, and exact description of the same.

The principal object of this invention is to produce a porous substance which can be used for filtering water and nearly all the known acids or bases without being injured or dissolved by the operation.

The invention consists in a composition of sand or silicic acid, marble-dust or carbonate of lime, and glass or silicates of soda or potash in such proportion that by heating the mixture a porous substance is produced which is capable of withstanding the influence of most liquids, and which, when molded in the proper shape, can be used for filtering and other purposes.

The proportion in which I mix the above-named ingredients together is about as follows: sand, from four to six pounds; marble-dust, three to six ounces; silicate of soda or of potash, one pound. The proportion of sand and silicate of soda is varied according to the heat to which the composition is to be exposed.

By wetting the composition with water the composition is rendered plastic, so that it can be molded in any desired form or shape. For small articles it is desirable to add a small quantity of gum-water to make the composition stick together more readily. When molded the different articles are heated in a kiln or oven to a high white heat, and a porous substance is produced which is capable of withstanding most liquids, and which can be used with great advantage for filtering and other purposes.

By adding to the composition black oxide of manganese or oxide of iron or some other metallic oxide any desired color may be given to the articles.

Having thus fully described my invention, what I claim as new, and desire to secure by Letters Patent, is—

The employment or use of a composition for porous stone made of the ingredients herein specified and mixed together in about the proportion and substantially in the manner described.

FRD. C. KRAUSE.

Witnesses:
M. S. PARTRIDGE,
DANIEL ROBERTSON.